United States Patent

[11] 3,537,363

| [72] | Inventors | George E. Long<br>Rte. 2, Box 382, Monroe, 98272, and<br>Howard G. Anson, 15823 35th NE, Seattle,<br>Washington 98105 |
|---|---|---|
| [21] | Appl. No. | 745,507 |
| [22] | Filed | July 17, 1968 |
| [45] | Patented | Nov. 3, 1970 |

[54] SERVO-CONTROLLED HYDRAULIC SYSTEM
11 Claims, 1 Drawing Fig.

| [52] | U.S. Cl. | 94/46, 60/52 |
|---|---|---|
| [51] | Int. Cl. | E01c 19/48 |
| [50] | Field of Search | 318/(Inquired); 94/46; 60/52 |

[56] References Cited
UNITED STATES PATENTS

| 2,911,892 | 11/1959 | Pollitz | 94/46 |
|---|---|---|---|
| 3,233,409 | 2/1966 | Reis | 60/52 |
| 3,247,669 | 4/1966 | Hann | 60/52 |
| 3,453,939 | 7/1969 | Pollitz | 94/46 |

*Primary Examiner*—Jacob L. Nackenoff
*Attorney*—Seed, Berry and Dowrey

ABSTRACT: A servocontrol regulates the output of a variable displacement hydraulic pump to a hydraulic motor responsive to changes in a predetermined relationship between a sensing input and a feedback input to a control means, the latter being adapted to control the output of an electromechanical transducer to the pump. This servocontrol is particularly suited to control the conveyor system of a road paving machine.

Patented Nov. 3, 1970
3,537,363
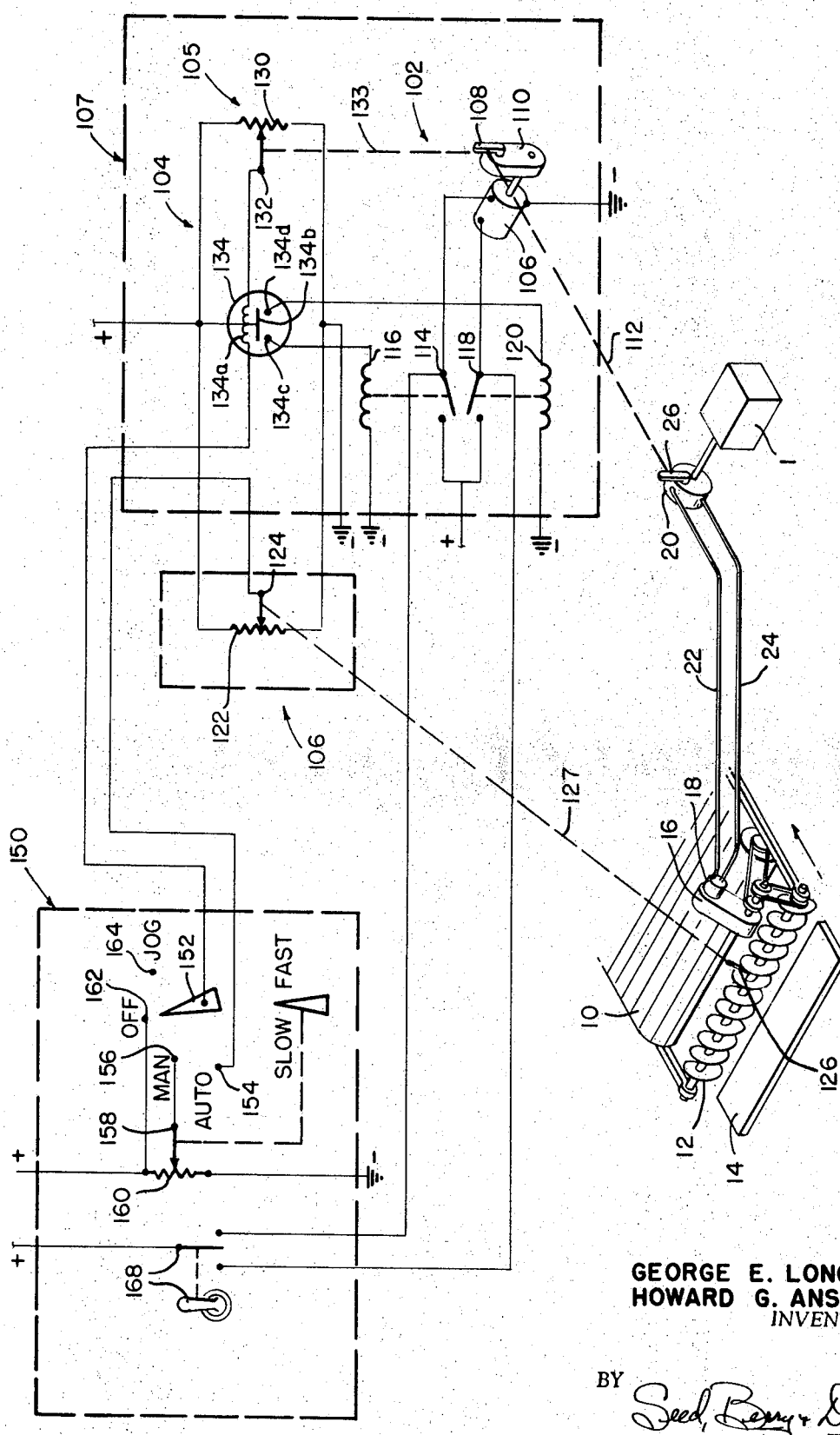
GEORGE E. LONG
HOWARD G. ANSON
INVENTORS.
BY
*Seed, Berry + Downey*
ATTORNEYS

SERVO-CONTROLLED HYDRAULIC SYSTEM

This invention relates to systems wherein a prime mover drives a workload through a closed circuit hydraulic pump and motor, the hydraulic pump input being coupled to the prime mover and the hydraulic motor output being coupled to the workload. More particularly, this invention relates to such a system including a servocontrol provided to continuously sense a variable function of the environment system and to regulate the hydraulic circuit according to variations in a predetermined relationship within the servocontrol.

This invention may be provided in an environment system to control the operation of a variety of workloads. By way of examples illustrating the wide applicability of this invention, the workload may be a road surface paving machine wherein the material conveyor system is operated by a hydraulic circuit from the machine prime mover, a revolvable "mix" drum of a "ready-mix" concrete truck wherein the drum is operated by a hydraulic circuit from the power takeoff of the truck engine, an asphalt spray pump on an asphalt-surfacing tank truck wherein the spray pump is operated by a hydraulic circuit from the power takeoff of the truck engine, or a track drive system of an endless track vehicle wherein the track drive system is operated by a hydraulic circuit from the tractor engine. In each of the above examples, a variable function within the environment exists that must be sensed and the hydraulic circuit controlled according to the changes in the sensed function. In the case of a road surface paving machine, the level of paving material distributed by the conveyor system across a road surface must be sensed and the hydraulic circuit controlled to regulate the conveyor system to maintain a desired paving material level. In the cases of a "ready-mix" truck and an asphalt spray truck, r.p.m. changes in the truck engine (prime mover) must be sensed and the hydraulic circuit controlled to regulate the drum r.p.m. or pump spray rate, respectively, in a predetermined manner regardless of changes in the sensed variable. In the case of an endless track vehicle, the speed of the tracks must be sensed and the hydraulic circuit controlled to regulate track speed in accordance with required vehicle steering and speed requirements.

The FIG. depicts one embodiment of the invention as applied to a road surface paver to regulate the amount of paving material distributed transversely to the road surface being paved.

The present invention comprises a servocontrol coupled to a variable output hydraulic pump and motor circuit and includes electromechanical transducer means coupled to the hydraulic pump to regulate the output therefrom to the motor so as to maintain a desired motor output, sensing transducer means for continuously sensing a variable function of the environment system, feedback transducer means for continuously sensing a variable function responsive to the electromechanical transducer means output, and control means having a sensing input coupled to the sensing transducer means and a feedback input coupled to said feedback transducer means and an output coupled to the electromechanical transducer means. The control means is adapted to control the output of the electromechanical transducer means responsive to changes in a predetermined relationship between the inputs to the control means, thus to regulate the hydraulic pump output to the motor.

Depending upon the nature of the variable function of the environment system to be sensed, the sensing transducer means may be velocity sensitive, elevation sensitive, pressure sensitive, temperature sensitive, rate sensitive, directional sensitive or the like. The signal output from the sensing transducer means may be voltage oriented or current oriented, depending upon whether the control means is voltage sensitive or current sensitive. The control means may be preset to effect the hydraulic circuit motor output necessary to provide a required velocity, elevation, pressure, volume, or the like within the environment system.

In the preferred embodiments of the invention, the electromechanical transducer means comprises a reversible electric motor mechanically linked to the volumetric output of the hydraulic circuit pump through a high reduction drive train. The control means comprises a current sensitive circuit that actuates the reversible electric motor, depending upon the electric motor output required, responsive to the input sensing and feedback signals. The current sensitive circuit preferably includes a balanced-coil device that is unbalanced by input sensing signals to complete either a "forward" or "reverse" electric motor circuit depending upon the relation of the input sensing signals to the operating parameters of the control means, and that is rebalanced by input feedback signals to open the electric motor circuit previously completed. The balanced-coil device may be of the type that is actuated to complete an electric motor circuit by current direction or of the type that is actuated by a selected one of multiple currents.

With reference to the FIG., the environment system depicted—namely, a road paving machine—comprises a slat-type material feed conveyor 10 adapted to deliver paving material from a hopper (not shown) rearwardly (with respect to the direction of travel of the machine along the roadway) to a transverse screw conveyor 12 for distribution across a roadway such that a screed 14 (rearwardly positioned on the machine) will level the paving material to produce the desired paved surface as the machine travels along the roadway.

In the past, the driving engine of such machines has been drivingly connected to the slat conveyor and to the screw conveyor with the driving connection to the slat conveyor being controlled in a start-stop fashion responsive to variations in the depth of the paving material in the screw between maximum and minimum levels. In such systems, the depth variation is often not controllable closer than + or −6 inches which is generally unsatisfactory since such wide fluctuations can deleteriously affect the smoothness of the paved surface by causing the leveling screed to oscillate vertically.

Returning to the FIG., both the slat conveyor 10 and the screw conveyor 12 are mechanically driven, as by a chain drive and gear reducer assembly 16, from the output shaft of a variable displacement hydraulic motor 18. The hydraulic motor 18 is driven by a variable displacement hydraulic pump 20 which, together with the interconnecting high and low pressure hydraulic fluid transfer line 22 and 24, constitute a variable-output closed-loop hydraulic circuit. The volumetric output of the pump 20 is externally controllable by a volumetric output control such as a pump swashplate-adjusting control lever 26.

The position of the pump swashplate control lever 26, and hence the volumetric output of the pump 20, is regulated by a servocontrol mechanism which comprises an electromechanical transducer means 102, control means 104, a sensing transducer means 106, and a feedback transducer means 105. The means 102, 104 and 105 are preferably encased as an actuator unit 107 with electrical power inputs and the lever 108 mounted externally of the encasing.

The electromechanical transducer means 102 comprises a reversible electric motor 106, the output of which is connected to an actuating lever 108 through a high reduction drive train 110. The lever 108 is operably connected to the pump swashplate control lever 26 by means such as a mechanical linkage 112. The motor 106 is direct current operated either in the "forward" direction in the "reverse" direction through separate circuit paths controlled by the circuitry of the control means 104. The "forward" DC circuit path includes a normally open relay switch 114 in series with the motor and a DC power source and operated by relay 116 in the circuit of the control means 104. The "reverse" DC circuit path includes a normally open relay switch 118 in series with the motor and a DC power source and operated by relay 120 in the circuit of the control means 104. Thus, the motor 106 is operated only when one or the other of the switches 114—118 is closed to complete a closed circuit by operation of the control means 104.

The sensing transducer means 106 comprises a variable resistance 122 in series with a DC power source having a variable tap 124 remotely positionable by a sensor paddle 126 through a suitable linkage mechanism 127. Sensor paddle 126 is pivotally mounted with its paddle end extending into the screw conveyor 12 to contact paving material therein such that the relative position of the variable tap 124 is directly proportional to the level of the paving material within the screw conveyor 12.

The feedback transducer means comprises a variable resistance 130 having a variable tap 132 remotely positionable by the motor actuating lever 108 through a suitable linkage mechanism 133. The interconnecting linkage is such that the relative position of the variable tap 132 is directly proportional to the position of the actuating lever 108.

The control means 104 circuit comprises a resistance bridge, one parallel leg which constitutes variable resistance 122 and the other parallel leg of which constitutes a variable resistance 130, and a twin output balanced-coil device 134, and the relays 116—120 each connected in series with a DC power source and an output of the balanced-coil device 134. The balanced-coil device 134 is a sensitive current-directional relay, an example of which is a single coil micropositioner AYLZ manufactured by Barber-Colman, with a coil 134a connected to the variable resistance taps 124—132 and statically balanced contact arm 134b connected to one terminal of a DC power source and two outputs 134c—d contactable by the contact arm.

The relay circuit of the balanced coil device 134 is completed through the paving machine operator's control panel 150. The circuitry of the control panel 150 includes a multiposition manually operable control switch 152, the base of which is connected to the balanced-coil device as shown. The switch contacts include an "automatic" position 154 connected to the variable tap 124, a "manual" position 156 connected to the manually controllable variable tap 158 of a variable resistance 160, an "off" position 162 connected in series with variable resistance 160, and a "jog" position 164 unconnected. The control panel 150 also mounts a manually operable two position toggle switch 168, the two contacts of which are connected into the motor circuit to shunt the two relay switches 114—118.

During operation of the paving machine, the servocontrol of this invention functions as follows when the control switch is set on "automatic".

As the paving material is discharged from the slat conveyor 10 into the screw conveyor 12 and distributed laterally by the screw, the level of the paving material is sensed by the sensor paddle 126 which thereby positions the variable tap 124 of variable resistance 122 and establishes a voltage potential at that input to the relay of the balanced-coil device 134. If the variable tap 132 of variable resistance 130 is positioned such that the voltage potential at the opposite input to the relay of the balanced-coil device 134 is equal the voltage potential on the opposite side of the resistance bridge, where will be no current through the balanced-coil device 134. Thus, motor 106 will not be actuated, the pump swashplate control lever 26 will remain in a set position such that the output of the motor 106 will remain constant and the conveyors 10 and 12 will continue to be driven at an unchanged rate.

If, however, the voltage potentials at the inputs to the relay of the balanced-coil device 134 are not balanced, a current will be created through the balanced coil device 134 in a direction dependent upon whether the paving material level, as sensed by the sensor paddle 126, is too high or too low. Depending on the current direction through the relay of the balanced coil device 134, the balanced contact arm 134b, will close on one or the other of the two outputs 134c or 134d from the balanced-coil device 134 and actuate one or the other of the relays 116 or 120 to close one or the other of the relay switches 114 or 118, and thereby activate the motor 106 in the "forward" or "reverse" direction. Upon actuation of the motor 106, the actuating lever 108 and, concomitantly, the pump swashplate control lever 26 will be rotated in the selected direction to either increase or decrease the output of motor 106 to effect a concomitant increase or decrease in the conveyor feed rate, thus to control the sensed level of the paving material. The actuating lever 108 will rotate in the selected direction until the variable resistance tap 132, coupled thereto, is repositioned to balance the voltage potentials across the balanced-coil device 134. When the voltage potentials thereacross are rebalanced, the relay of the balanced-coil device 134 will open, deactivating the previously activated relay 116 or 120 and opening the respective switch 114 or 118 and deactivating the motor 106. The resultant output of the motor 106 will thereafter remain constant until the sensed input signal to the balanced-coil again creates an unbalanced condition necessitating a change in the output of motor 106.

Thus, when the sensing input signal and the feedback input signal are balanced, the balanced-coil device 134 is inactive. When these input signals are not balanced, a rebalanced condition occurs by varying the input signals until they do balance. By this arrangement, the sensed paving material can be maintained at a desired level within a fraction of an inch without making the necessity of effecting drastic changes in the conveyor rates.

If manual servocontrol of paving material level is desired, as it may well be upon startup of the paving machine as well as at other times during machine operation, the panel control switch 152 is switched to the "manual" position whereupon manually variable resistance 160 is substituted for variable resistance 122 to provide the control means sensing input signal. Manually positioning the variable tap 158 of variable resistance 160 will cause the control means to function to control the hydraulic circuit in the same manner as through the sensing input signals were supplied by the automatic sensing transducer means 106. Thus variable resistance 160 functions as a manually operable sensing transducer means.

If manual, nonservocontrol of the paving material is desired, the panel control switch is switched to the "jog" position thereby disconnecting the control means to the extent that toggle switch 168 may operate the motor 106 and control the hydraulic circuit without automatic feedback.

If it is desired to turn off the conveyor system, the panel control switch 152 is switched to the "off" position thereby placing a predetermined value of resistance such as the full value of resistance 160, in the circuit of motor 106. The effect of this is to cause the balanced-coil device 134 to complete the desired circuit of motor 106 such that actuating lever 108, and the pump swashplate control level 26 linked thereto, will be rotated to a position where the output flow of pump 20 is terminated. When this position is reached, the feedback signal will have rebalanced the potentials across the balanced-coil device such that the control means 104 will be inactivated at the point that the hydraulic pump output is terminated, thus to shut down the servocontrol at that point.

It will be observed that in the foregoing paving machine example, an external supply of DC power was supplied to both the sensing transducer means to provide a sensing input signal and to the control means to provide a feedback input signal. If either the sensed variable function of the environment system a feedback function involves a mechanically rotating element, the respective transducers involved could comprise AC tachometer generators and related rectifier circuits to provide the necessary input signals proportional to the sensed function. In such instances, a separate power supply would be required to power electromechanical transducer means such as motor 134. Also, in such instances, the current direction-sensitive balanced-coil device 134 could be employed or, alternately, a current differential or comparative balanced-coil device could be employed. A suitable example of the latter is a double coil micropositioner AYLZ manufactured by Barber-Coleman.

In surface pavers of the type depicted and described, it is usually the case that a pair of parallel slat conveyors are employed, each delivering paving material to its associated transverse screw conveyor. In the application of this invention, both sets of parallel conveyors assemblies would be separately powered by separate hydraulic circuits of the type described and the servocontrol mechanism would be duplicated such that the operation of each conveyor set is independently controllable.

We claim:

1. In a system comprising a hydraulic circuit including a variable output hydraulic pump circuit and a hydraulic motor driven by said pump: the combination therewith of a servocontrol which comprises electromechanical transducer means coupled to said pump circuit to regulate the output flow rate therein so as to maintain a desired motor output; sensing transducer means continuously sensing a variable function and providing an electrical output signal responsive thereto; feedback transducer means continuously sensing a function variable responsive to the output of said electromechanical transducer means; and control means having a sensing input coupled to said sensing transducer means, a feedback input coupled to said feedback transducer means, said control means being adapted to control the output of said electromechanical transducer means to said pump circuit responsive to the inputs of said control means.

2. The system of claim 1 wherein said control means includes a normally open current-sensitive balanced-coil device adapted to be actuated to complete an electrical circuit to actuate said electromechanical transducer means when an imbalance exists between the sensing input and feedback input signals to said control means.

3. The system of claim 2 wherein said electromechanical transducer means includes a reversible electric motor and actuating means coupling the output of said motor to said hydraulic pump circuit; and wherein actuation of said balanced-coil device completes either a forward or a reverse motor circuit depending upon the relation of said sensing input signal to the operating parameters of said control means.

4. The system of claim 2 wherein said sensing transducer means includes a variable resistance means constituting one leg of a bridge circuit bridged by said balanced-coil device; and wherein said feedback transducer means includes a variable resistance means constituting another leg of said bridge circuit and including a variable tap thereof linked to said electromechanical transducer means to provide a feedback input circuit path to said balanced-coil device.

5. The system of claim 1 wherein said sensing transducer means includes a sensor adapted to continuously sense the elevation of a material transported by a conveyor; and wherein said hydraulic motor is adapted to be drivingly coupled to a conveyor such that the conveyor speed can be regulated by said servocontrol to maintain a predetermined material elevation on the conveyor.

6. The system of claim 1 wherein said electromechanical transducer means comprises a reversible electric motor, actuating means coupling the output of said motor to said hydraulic pump, and an electrical network including normally open relay switch means interconnecting the motor input to a power source; wherein said sensing transducer means includes a variable resistance having a variable tap positionable proportionately to the changes in the sensed variable function; wherein said feedback transducer means includes a variable resistance having a variable tap positionable proportionately to changes in position of the motor actuating means; and wherein said control means includes a resistance bridge circuit wherein the sensing transducer means variable resistance and the feedback transducer means variable resistance constitute opposite legs of such bridge circuit, and includes a balanced-coil device bridging said bridge circuit and having a sensing input coupled to the variable tap of the feedback transducer means variable resistance and having an output coupled to said relay switch means, said balanced-coil device being in a nonconducting condition when its inputs are balanced and being in a conducting condition to actuate said relay switch means when its inputs are unbalanced.

7. A surface paving system which comprises a rearwardly traveling paving material conveyor; a transversely traveling paving material conveyor positioned rearwardly of said rearwardly traveling conveyor and adapted to receive paving material there from and distribute such paving material laterally across a surface to be paved; a prime mover for said system; a hydraulic conveyor-driving circuit comprising a variable output hydraulic pump having a power input coupled to said prime mover, a hydraulic motor hydraulically coupled to said hydraulic pump in a closed circuit and having a power output, and drive means drivingly coupling the hydraulic motor power output to the conveyor; and conveyor speed control means including a servocontrol which comprises electromechanical transducer means coupled to said pump to regulate the output flow rate therefrom so as to maintain a desired hydraulic motor output, sensing transducer means continuously sensing the elevation of paving material in the transversely traveling conveyor and providing an electrical output signal responsive thereto, feedback transducer means continuously sensing the output of said electromechanical transducer means, and control means having a sensing input coupled to said sensing transducer means and a feedback input coupled to said feedback transducer means and an output coupled to said electromechanical transducer means, said control means being adapted to control the output of said electromechanical transducer means to said pump responsive to the inputs to said control means.

8. The system of claim 7 wherein said control means includes a normally open current-sensitive balanced-coil device adapted to be actuated to complete an electrical circuit to actuate said electromechanical transducer means when an imbalance exists between the sensing input and feedback input signals to said control means.

9. The system of claim 8 wherein said electromechanical transducer means includes a reversible electric motor and actuating means coupling the output of said motor to said hydraulic pump; and wherein actuation of said balanced-coil device completes either a forward or a reverse motor circuit depending upon the relation of said sensing input signal to the operating parameters of said control means.

10. The system of claim 8 wherein said sensing transducer means includes a variable resistance means constituting one leg of a bridge circuit bridged by said balanced-coil device; and wherein said feedback transducer means includes a variable resistance means constituting another leg of said bridge circuit and including a variable tap thereof linked to said electromechanical transducer means to provide a feedback input circuit path to said balanced-coil device.

11. The system of claim 7 wherein said electromechanical transducer means comprises a reversible electric motor, actuating means coupling the output of said motor to said hydraulic pump, and an electrical network including normally open relay switch means interconnecting the motor input to a power source; wherein said sensing transducer means includes a variable resistance having a variable tap positionable proportionately to the changes in the sensed variable function; wherein said feedback transducer means includes a variable resistance having a variable tap positionable proportionately to changes in position of the motor actuating means; and wherein said control means includes a resistance bridge circuit wherein the sensing transducer means variable resistance and the feedback transducer means variable resistance constitute opposite legs of such bridge circuit, and includes a balanced-coil device bridging said bridge circuit and having a sensing input coupled to the variable tap of the feedback transducer means variable resistance and having an output coupled to said relay switch means, said balanced-coil device being in a nonconducting condition when its inputs are balanced and being in a conducting condition to actuate said relay switch means when its inputs are unbalanced.

UNITED STATES PATENT OFFICE
CERTIFICATE OF CORRECTION

Patent No. 3,537,363　　　　　　　Dated November 3, 1970

Inventor(s) George E. Long et al

It is certified that error appears in the above-identified patent and that said Letters Patent are hereby corrected as shown below:

In the figure of the drawing appearing on the cover sheet of the patent and on the single sheet of drawing, the reference numeral "106" in the center of the figure should be changed to -- 103 --.

In the specification, column 2, line 49, change "106" to -- 103 --; line 59, after "direction" insert -- or --; line 71, change "106" to -- 103 --.

Column 3, line 9, change "motor" to -- pump --; line 52, change "where" to -- there --.

Column 4, line 31, change "106" to -- 103 --.

Column 5, line 50, insert -- pump -- after ","; line 59, change "motor" to -- pump --; line 65, after "the" (second occurence) insert -- sensing transducer means variable resistance and a feedback input coupled to the variable tap of the --.

Column 6, line 49, after "," insert -- pump --; line 58, change "motor" to -- pump --; line 64, after "the" (second occurence) insert -- sensing transducer means variable resistance and a feedback input coupled to the variable tap of the --; lines 65 and 66 delete "and having an output transducer means variable resistance".

Signed and sealed this 24th day of August 1971.

(SEAL)
Attest:

EDWARD M. FLETCHER, JR.　　　　　　WILLIAM E. SCHUYLER, JR.
Attesting Officer　　　　　　　　　Commissioner of Patents

Disclaimer 3,537,363.—*George E. Long*, Monroe, and *Howard G. Anson*, Seattle, Wash. SERVO-CONTROLLED HYDRAULIC SYSTEM. Patent dated Nov. 3, 1970. Disclaimer filed Jan. 17, 1972, by the inventor.
Hereby enters this disclaimer to claims 1, 5 and 7 of said patent.
[*Official Gazette March 7, 1972.*]